United States Patent
LaBrec

(10) Patent No.: US 7,422,794 B2
(45) Date of Patent: Sep. 9, 2008

(54) DOCUMENT LAMINATE FORMED FROM DIFFERENT POLYESTER MATERIALS

(75) Inventor: Brian LaBrec, North Oxford, MA (US)

(73) Assignee: Digimarc Corporation, Beaverton, OR (US)

( * ) Notice: Subject to any disclaimer, the term of this patent is extended or adjusted under 35 U.S.C. 154(b) by 434 days.

(21) Appl. No.: 10/692,463

(22) Filed: Oct. 21, 2003

(65) Prior Publication Data

US 2005/0084693 A1 Apr. 21, 2005

(51) Int. Cl.
B32B 27/06 (2006.01)
B32B 27/08 (2006.01)
B32B 27/32 (2006.01)
B32B 27/36 (2006.01)

(52) U.S. Cl. ............ 428/480; 428/483; 428/195.1

(58) Field of Classification Search ............ None
See application file for complete search history.

(56) References Cited

U.S. PATENT DOCUMENTS

| | | | | |
|---|---|---|---|---|
| 4,362,775 A * | 12/1982 | Yabe et al. | .......... | 428/213 |
| 4,522,670 A * | 6/1985 | Caines | .......... | 156/220 |
| 4,765,999 A * | 8/1988 | Winter | .......... | 426/113 |
| 5,058,926 A * | 10/1991 | Drower | .......... | 283/109 |
| 5,618,621 A * | 4/1997 | Hasegawa et al. | .......... | 428/343 |
| 5,688,738 A * | 11/1997 | Lu | .......... | 503/227 |
| 5,783,024 A | 7/1998 | Forkert | | |
| 5,846,900 A * | 12/1998 | Reiter et al. | .......... | 503/227 |
| 5,928,788 A * | 7/1999 | Riedl | .......... | 428/411.1 |
| 6,003,581 A | 12/1999 | Aihara | | |
| 6,007,660 A | 12/1999 | Forkert | | |
| 6,066,594 A * | 5/2000 | Gunn et al. | .......... | 503/227 |
| 6,159,327 A | 12/2000 | Forkert | | |
| 6,245,167 B1 | 6/2001 | Stein | | |
| 6,283,188 B1 | 9/2001 | Maynard et al. | | |
| 6,576,309 B2 * | 6/2003 | Dalgewicz et al. | .......... | 428/36.8 |
| 6,673,423 B2 * | 1/2004 | Kranenburg-Van Dijk et al. | .......... | 428/203 |
| 6,773,735 B1 * | 8/2004 | Dalgewicz, III | .......... | 426/127 |
| 6,803,114 B1 * | 10/2004 | Vere et al. | .......... | 428/480 |
| 6,817,530 B2 | 11/2004 | Labrec et al. | | |
| 6,817,630 B1 * | 11/2004 | Fischer et al. | .......... | 283/67 |
| 2002/0146549 A1 * | 10/2002 | Kranenburg-Van Dijk et al. | .......... | 428/217 |
| 2002/0182352 A1 * | 12/2002 | Mitten et al. | .......... | 428/35.7 |
| 2003/0038174 A1 * | 2/2003 | Jones | .......... | 235/380 |

OTHER PUBLICATIONS

Eastman, Product Data Sheet, Eastar Copolyester 5011, Dec. 7, 2004, 2 pages.
Eastman, Product Data Sheet, Eastar Copolyester A150, Jun. 27, 2001, 3 pages.
Eastman, Product Data Sheet, Eastar Copolyester 6763, Apr. 26, 2005, 4 pages.

* cited by examiner

Primary Examiner—Vivian Chen

(57) ABSTRACT

A polyester laminate for an identification document is formed from different polyester materials. One of the polyester materials, such as PCTA, provides a durability property. Another of the polyester materials, such as PETG, provides a layer having a surface with a bonding property for bonding directly to a core without adhesive. The polyester material with the bonding property is selected to enable direct bonding to a printed core layer of TESLIN or polyester through a roll to roll or platen press process.

6 Claims, 3 Drawing Sheets

DOCUMENT LAMINATE FORMED FROM DIFFERENT POLYESTER MATERIALS

RELATED APPLICATION DATA

This application is related to the following U.S. patent:
U.S. Pat. No. 6,817,530 describing how to manufacture identification documents in a central issue process, which may be used to make embodiments of the invention.

Each of the above U.S. Patent documents is herein incorporated by reference in its entirety.

TECHNICAL FIELD

The invention relates to document laminate structures, such as those used in identification documents, and related methods for making these laminate structures.

BACKGROUND AND SUMMARY

Identification Documents

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening and prior to boarding their flight. In addition, because we live in an ever-evolving cashless society, ID documents are used to make payments, access an automated teller machine (ATM), debit an account, or make a payment, etc.

(For the purposes of this disclosure, ID documents are broadly defined herein, and include, e.g., credit cards, bank cards, phone cards, passports, driver's licenses, network access cards, employee badges, debit cards, security cards, visas, immigration documentation, national ID cards, citizenship cards, social security cards, security badges, certificates, identification cards or documents, voter registration cards, police ID cards, border crossing cards, legal instruments, security clearance badges and cards, gun permits, gift certificates or cards, membership cards or badges, etc., etc. Also, the terms "document," "card," "badge" and "documentation" are used interchangeably throughout this patent application.).

Many types of identification cards and documents, such as driving licenses, national or government identification cards, bank cards, credit cards, controlled access cards and smart cards, carry certain items of information which relate to the identity of the bearer. Examples of such information include name, address, birth date, signature and photographic image; the cards or documents may in addition carry other variable data (i.e., data specific to a particular card or document, for example an employee number) and invariant data (i.e., data common to a large number of cards, for example the name of an employer). All of the cards described above will be generically referred to as "ID documents".

FIGS. 1 and 2 illustrate a front view and cross-sectional view (taken along the A-A line), respectively, of an identification (ID) document 10. In FIG. 1, the ID document 10 includes a photographic image 12, a bar code 14 (which may contain information specific to the person whose image appears in photographic image 12 and/or information that is the same from ID document to ID document), variable personal information 16, such as an address, signature, and/or birthdate, and biometric information 18 associated with the person whose image appears in photographic image 12 (e.g., a fingerprint, a facial image or template, or iris or retinal template), a magnetic stripe (which, for example, can be on a side of the ID document that is opposite the side with the photographic image), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

Referring to FIG. 2, the ID document 10 comprises a pre-printed core 20 (also referred to as a substrate). In many applications, the core can be a light-colored, opaque material (e.g., TESLIN (available from PPG Industries), polyvinyl chloride (PVC) material, polyester, polycarbonate, etc.). The core 20 is laminated with a transparent material, such as clear PVC or polyester material 22, which, by way of example, can be about 1-5 mil thick. The composite of the core 20 and clear laminate material 22 form a so-called "card blank" 25 that can be up to about 30 mils thick. Information 26a-c is printed on the card blank 25 using a method such as Laser Xerography or Dye Diffusion Thermal Transfer ("D2T2") printing (e.g., as described in commonly assigned U.S. Pat. No. 6,066,594, which is incorporated hereto by reference in its entirety.) The information 26a-c can, for example, comprise variable information (e.g., bearer information) and an indicium or indicia, such as the invariant or nonvarying information common to a large number of identification documents, for example the name and logo of the organization issuing the documents. The information 26a-c may be formed by any known process capable of forming the indicium on the specific core material used.

To protect the information that is printed, an additional layer of transparent overlaminate 24 can be coupled to the card blank and printed information, as is known by those skilled in the art. Illustrative examples of usable materials for overlaminates include biaxially oriented polyester or other optically clear durable plastic film.

"Laminate" and "overlaminate" include, but are not limited to film and sheet products. Laminates used in documents include substantially transparent polymers. Examples of laminates used in documents include polyester, polycarbonate, polystyrene, cellulose ester, polyolefin, polysulfone, and polyamide. Laminates can be made using either an amorphous or biaxially oriented polymer. The laminate can comprise a plurality of separate laminate layers, for example a boundary layer and/or a film layer.

The degree of transparency of the laminate can, for example, be dictated by the information contained within the identification document, the particular colors and/or security features used, etc. The thickness of the laminate layers can vary and is typically about 1-20 mils. Lamination of any laminate layer(s) to any other layer of material (e.g., a core layer) can be accomplished using a lamination process.

In ID documents, a laminate can provide a protective covering for the printed substrates and provides a level of protection against unauthorized tampering (e.g., a laminate would have to be removed to alter the printed information and then subsequently replaced after the alteration.). Various lamination processes are disclosed in assignee's U.S. Pat. Nos. 5,783,024, 6,007,660, 6,066,594, and 6,159,327. Other lamination processes are disclosed, e.g., in U.S. Pat. Nos. 6,283,188 and 6,003,581. Each of these U.S. patents is herein incorporated by reference.

The material(s) from which a laminate is made may be transparent, but need not be. Laminates can include synthetic resin-impregnated or coated base materials composed of successive layers of material, bonded together via heat, pressure, and/or adhesive. Laminates also includes security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxy.

In a typical ID document, one or more laminate layers are joined together with the substrate, possibly including other security devices, such as holograms, integrated circuits, optical memory, RFID tag, etc. to form a complete document. These laminate layers are designed to enhance the durability and security of the identification documents. From the standpoint of durability, the laminate should increase the document's ability to withstand wear and tear experienced in the field, including heat and humidity that can compromise the integrity of the document structure.

From the standpoint of security, the laminate should be difficult to remove to prevent or at least evidence tampering.

Some ID documents use laminates that are made from a polyester outer layer and a polyolefin hot melt sealant. Because these are different materials, bonding them requires a primer or tie coat layer prior to sealant application. The bond between the polyester and adhesive layers are compromised when exposed to heat and humidity resulting in a document that prematurely fails in the field.

A security challenge is to design laminates for document structures that are difficult to separate from the substrate. For example, some document structures use a thermoplastic sealant to bond polyester film laminates to a document core. This bonding process is subject to a de-laminating attack, where the attacker heats the document in an attempt to separate the laminate from the core. The activation temperature at which the laminate and sealant moves is quite different in some structures, and this characteristic can enable an attacker to remove the laminate without destruction of the document or visible evidence of tampering.

The invention provides laminates for documents, laminated documents and methods for making both laminates and the laminated documents. One aspect of the invention is a polyester laminate for a document. It is formed from different polyester materials to produce a polyester laminate having desired durability and bonding properties. One of the polyester materials provides a durability property. Another of the polyester materials provides a layer having a bonding property for bonding the laminate directly to a core layer without requiring an adhesive.

In one embodiment, the polyester material providing the durability comprises PCTA copolyester, and the polyester material with the bonding property comprises PETG copolyester. In this case, the polyester material with the bonding property is selected to enable direct bonding to a core layer of TESLIN or polyester through a roll to roll or platen press process. The polyester materials are selected to remove the weak link between the laminate and adhesive used to bond it to the core. By creating a laminate containing similar materials, there is no separate adhesive interface between the laminate and core. The polymer chains intermingle, and thus, the polyester laminate requires no adhesive, eliminating the adverse effect of heat and humidity on the interface between the laminate and core layers. Further, the polyester laminate addresses the problem of separation attacks. By using two polyester materials in which the activation temperature are close to one another, the addition of heat causes the destruction of the entire document.

Additional aspects of the invention include methods for making the laminate. The laminate may be made by joining separate polyester materials with desired durability and bonding properties in variety of methods, such as roll to roll, extrusion coating, coextrusion, platen press, and injection/extrusion molding processes.

Additional aspects of the invention include laminated documents and methods for making the laminated documents.

BRIEF DESCRIPTION OF THE DRAWINGS

The advantages, features, and aspects of embodiments of the invention will be more fully understood in conjunction with the following detailed description and accompanying drawings, wherein.

Figure 1:
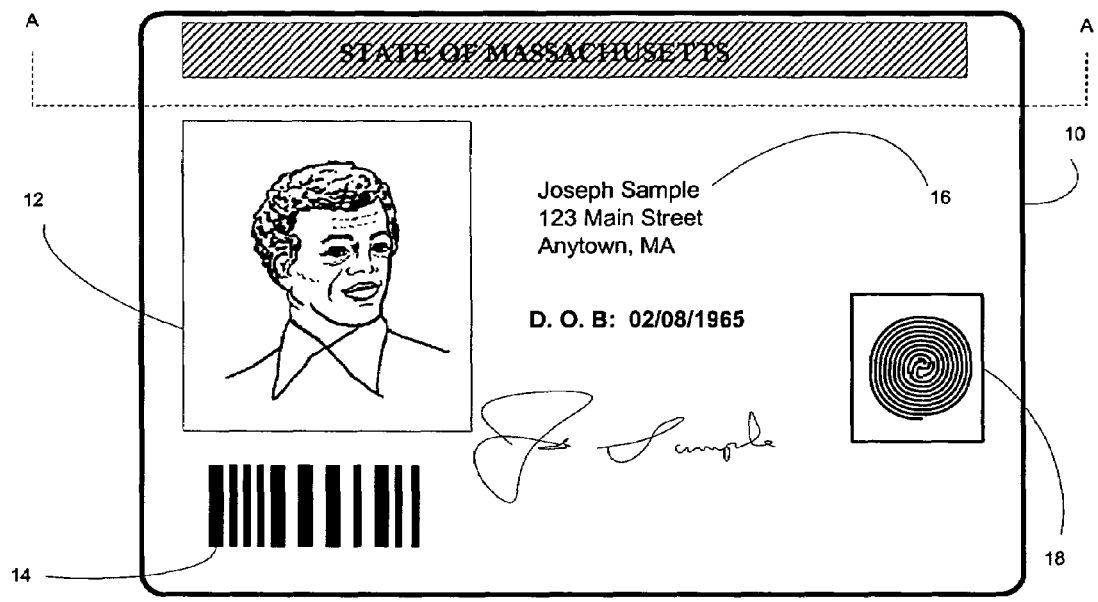
FIG. 1 is an illustrative example of an identification document.
Figure 2:
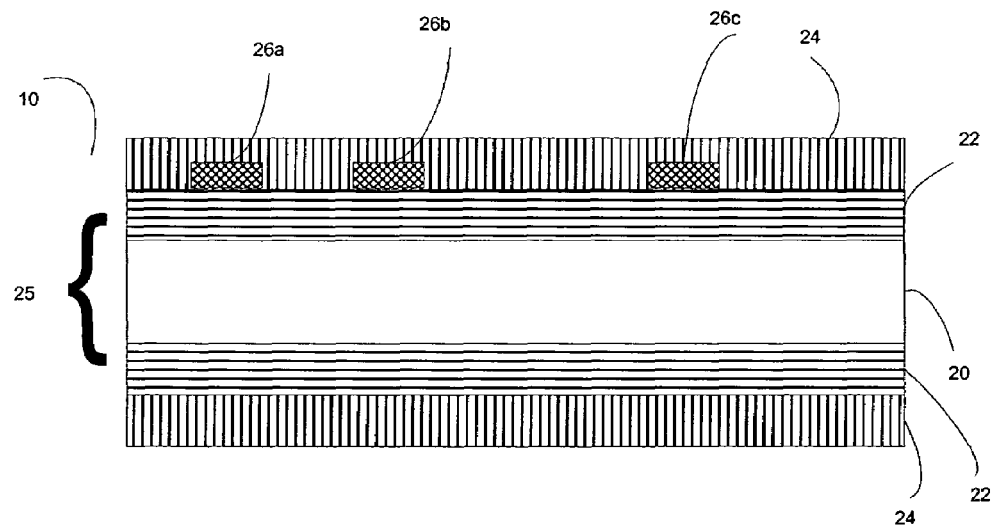
FIG. 2 is an illustrative cross section of the identification document of FIG. 1, taken along the A-A line.

Of course, the drawings are not necessarily drawn to scale, with emphasis rather being placed upon illustrating the principles of the invention. In the drawings, like reference numbers indicate like elements or steps. Further, throughout this application, certain indicia, information, identification documents, data, etc., may be shown as having a particular cross sectional shape (e.g., rectangular) but that is provided by way of example and illustration only and is not limiting, nor is the shape intended to represent the actual resultant cross sectional shape that occurs during manufacturing of identification documents.

DETAILED DESCRIPTION

Terminology

In the foregoing discussion, the use of the word "ID document" is broadly defined and intended to include all types of ID documents, including (but not limited to), documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver's licenses, network access cards, employee badges, debit cards, security cards, visas, immigration documentation, national ID cards, citizenship cards, social security cards, security badges, certificates, identification cards or documents, voter registration and/or identification cards, police ID cards, border crossing cards, security clearance badges and cards, legal instruments, gun permits, badges, gift certificates or cards, membership cards or badges, and tags. Also, the terms "document," "card," "badge" and "documentation" are used interchangeably throughout this patent application.). In at least some aspects of the invention, ID document can include any item of value (e.g., currency, bank notes, and checks) where authenticity of the item is important and/or where counterfeiting or fraud is an issue.

For purposes of illustration, the following description will proceed with reference to ID document structures (e.g., TESLIN-core, multi-layered ID documents). It should be appreciated, however, that the invention is not so limited. Indeed, as those skilled in the art will appreciate, the inventive techniques can be applied to many other structures formed in many different ways.

Document Laminates Formed From Different Polyester Materials

Figure 3:
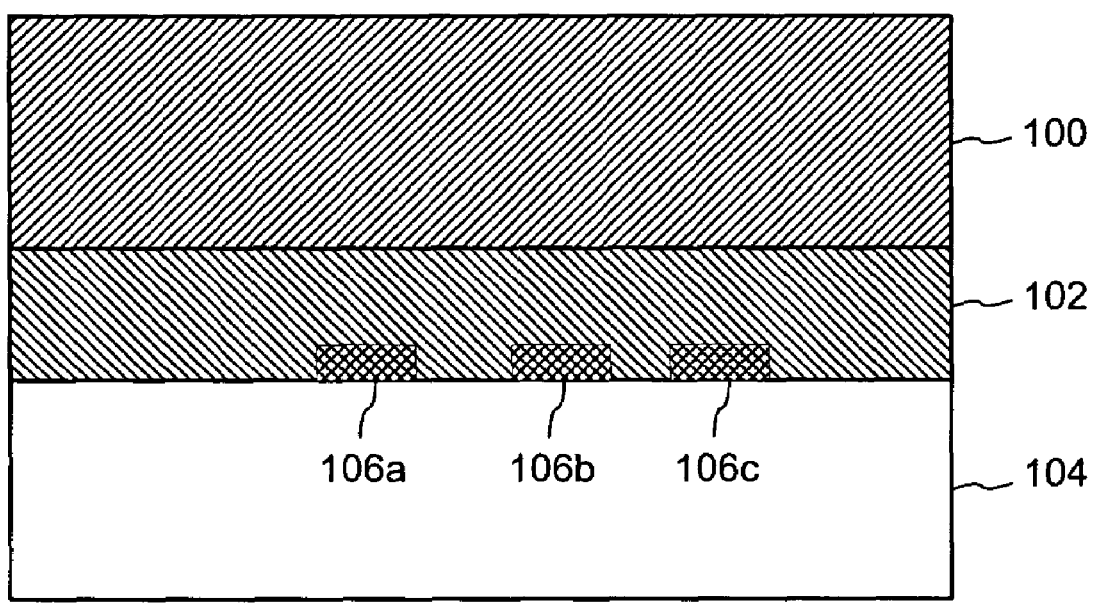
FIG. 3 is a diagram illustrating a cross section of an identification document with a laminate formed from different polyester materials.

FIG. 3 is a diagram illustrating an example of a polyester laminate structure formed from two different polyester materials 100, 102 and bonded to a pre-printed core layer 104. The core 104 is printed with variable and/or fixed printed information 106a-c, such as the bearer's photo, demographic information, security indicia, bar codes, and other text and image data. Methods for printing this information are detailed further below.

In this embodiment, the laminate is formed from two different polyester layers. Additional polymer layers may also be included. A first laminate layer 100 forms the outer surface of the document structure. It comprises a first polyester material selected for its durability. In particular, a durable polyester material is selected that is highly chemically and mechanically resistant. One example of a polyester material with these properties is A150 PCTA material from Eastman Chemical. This particular polyester is one of the most durable, and is found to be chemically and mechanically resistant.

A150 Copolyester from Eastman is a poly(1,4-cyclohexylene-dimethylene terephthalate/isophthalate). It is produced by reacting terephthalic acid and isophthalic acid with the glycol 1,4-cyclohexanedimethanol.

A second laminate layer 102 of a different polyester material forms an inner surface of the laminate and has bonding properties for bonding the composite laminate structure directly to a TESLIN or polyester core 104. Examples of this second material include PETG 5011 or PETG 6763 from Eastman Chemical. PET refers to polyethylene terephthalate. PETG is also known as glycolised polyester, and the "G" represents glycol modifiers.

Copolyester 5011 from Eastman Chemical is a glycol modified polyethylene terephthalate(PET). The modification is made by adding a second glycol, cyclohexanedimethanol (CHDM) during the polymerization stages. The second glycol is added in the proper proportion to produce an amorphous polymer.

Copolyester 6763 from Eastman Chemical is a clear, amorphous material. Because of its clarity, toughness and good melt strength at processing temperatures, it is useful in a variety of processing techniques including film and sheet extrusion.

Both of these PETG polyesters bond well to a TESLIN core layer and act as an adhesive layer in this construction. Together, the different polyester materials form a composite laminate layer. This laminate layer is then bonded to the front and/or back of the core layer in the ID document. The ratio of A150 to 6763 or 5011 can be altered to optimize the performance.

Figure 4:
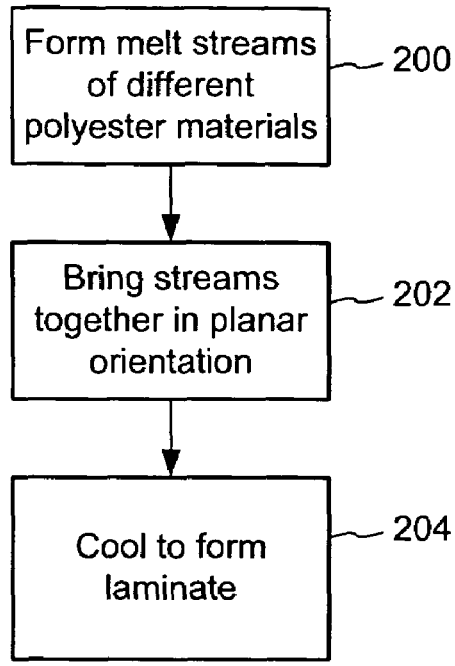
FIG. 4 is a flow diagram illustrating a method for creating the laminate shown in FIG. 3.

FIG. 4 illustrates a process for making a composite laminate structure such as shown in FIG. 3. The manufacturing process starts with the two different polyester materials that are melted to form two melt streams (200). Both melt streams are brought together in a planar orientation (202) and cooled to form a single laminate at the exit of the machine (204).

Figure 5:
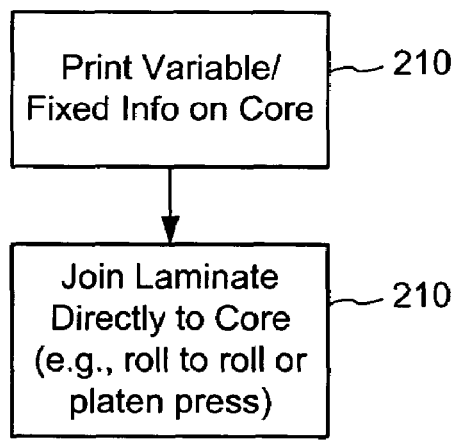
FIG. 5 is a flow diagram illustrating a method for creating an identification document with a laminate created in the method of FIG. 4.

FIG. 5 illustrates a method of making a document using the composite laminate structure. Variable and/or fixed information is printed on the core layer (210). In particular for TESLIN core documents, for example, the TESLIN core is pre-printed with preprinted inks, including covert UV/IR inks as described below. Next, the laminate is joined directly to the front and/or back of the core. A roll-to-roll or platen press can be used to join the surface of the laminate with bonding property to the core. To create a platen press version, A150 is replaced by a polymer that does not crystallize under conditions typically found in a platen press process.

The composite laminate described above can be bonded to a polyester core layer. Upon lamination of the composite laminate to the polyester core, the resulting structure forms one solid piece of polyester in which intrusion is impossible because the interface is not discernable.

The embodiments detailed above are examples of how to mingle different polyester materials to achieve a synergistic effect that exceeds each material's properties. For example, A150 PCTA does not bond to a TESLIN core but is chemically and mechanically resistant, and 6763 and 5011 PETG bond well to the TESLIN core but are not as chemically or mechanically resistant.

The composite laminate structure is not limited to two layers, but instead, can be increased to additional layers, each contributing in durability and security.

While a coextrusion is illustrated, alternative processes may be used to join polyester layers into a composite laminate. These processes include roll-to-roll, extrusion coating, platen press, and injection/extrusion molding processes.

Other types of polymers may be used to create a coextruded laminate product as described above. The outer layer should have a durability property, such as properties that prevent cracking and/or aging. The inner layer forms a surface for bonding to a document layer, such as the core layer described above. It has a bonding property that facilitates direct bonding to the document layer. This inner layer is chemically related to/miscible with the laminate layer with which it is joined, e.g., by coextrusion to create the coextruded laminate. It is also chemically related to/miscible with the document layer to which it is joined as described. Bonding properties of the inner layer include, for example, its chemical relationship with the layer to which it is joined (e.g., they are miscible), its molar attraction to the layer to which it is joined, its degrees of melting and viscosity. For example, the inner bonding layer in the laminate has a different degree of melting and viscosity than the outer layer or layers providing durability that enable it to bond to the document layer to which the laminate is joined.

In the laminate structures described above, a laminate layer is selected that has a bonding property for bonding the laminate structure directly to document base materials without a separate adhesive layer. These document base materials include toners and inks printed on a TESLIN, polyester, copolyester, amorphous polyester, or like family substrates.

As illustrated above, coextrusion methods may be used to join two or more laminate layers into the laminate structure before direct bonding to the base materials. Each of these laminate layers can contribute desired durability and bonding properties for direct bonding to a document's base materials without adhesive. In coextrusion methods, a carrier layer is coextruded with one or more performance enhancing layers. In the example provided above, the carrier layer comprises a PCTA copolyester. This carrier provides durability performance while the enhancement layers (e.g., PETG, etc.) provide bonding performance that increase the security of the identification document by avoiding the need for an adhesive layer between the laminate and document base material. Other materials can be used as the carrier layer, and a material acting as a carrier in one embodiment may act as an enhancement layer in other embodiments.

A list of materials that may be combined with a carrier layer by coextrusion to provide a bonding property that enhances bonding performance with base materials of inks, toners, and core TESLIN, polyester, copolyester, amorphous polyester, or like family substrates, includes, but is not limited to: SURLYN, mLDPE, EVA, EEA, and EMA.

A list of materials that provide a durability property for enhancing durability performance, either as a carrier or enhancement layer, include, but are not limited to: LDPE, HDPE, PP, and LLDPE. Members of this particular family can also be used as bonding layers coupled with one of the others in this family as the carrier.

Manufacture and Printing Environments

Commercial systems for issuing ID documents are of two main types, namely so-called "central" issue (CI), and so-called "on-the-spot" or "over-the-counter" (OTC) issue.

CI type ID documents are not immediately provided to the bearer, but are later issued to the bearer from a central location. For example, in one type of CI environment, a bearer reports to a document station where data is collected, the data are forwarded to a central location where the card is produced, and the card is forwarded to the bearer, often by mail. Another illustrative example of a CI assembling process occurs in a setting where a driver passes a driving test, but then receives her license in the mail from a CI facility a short time later. Still another illustrative example of a CI assembling process occurs in a setting where a driver renews her license by mail or over the Internet, then receives a drivers license card through the mail.

In contrast, a CI assembling process is more of a bulk process facility, where many cards are produced in a centralized facility, one after another. (For example, picture a setting where a driver passes a driving test, but then receives her license in the mail from a CI facility a short time later. The CI facility may process thousands of cards in a continuous manner.).

Centrally issued identification documents can be produced from digitally stored information and generally comprise an opaque core material (also referred to as "substrate"), such as paper or plastic, sandwiched between two layers of clear plastic laminate, such as polyester, to protect the aforementioned items of information from wear, exposure to the elements and tampering. The materials used in such CI identification documents can offer the ultimate in durability. In addition, centrally issued digital identification documents generally offer a higher level of security than OTC identification documents because they offer the ability to pre-print the core of the central issue document with security features such as "micro-printing", ultra-violet security features, security indicia and other features currently unique to centrally issued identification documents.

In addition, a CI assembling process can be more of a bulk process facility, in which many cards are produced in a centralized facility, one after another. The CI facility may, for example, process thousands of cards in a continuous manner. Because the processing occurs in bulk, CI can have an increase in efficiency as compared to some OTC processes, especially those OTC processes that run intermittently. Thus, CI processes can sometimes have a lower cost per ID document, if large volumes of ID documents are manufactured.

In contrast to CI identification documents, OTC identification documents are issued immediately to a bearer who is present at a document-issuing station. An OTC assembling process provides an ID document "on-the-spot". (An illustrative example of an OTC assembling process is a Department of Motor Vehicles ("DMV") setting where a driver's license is issued to person, on the spot, after a successful exam.). In some instances, the very nature of the OTC assembling process results in small, sometimes compact, printing and card assemblers for printing the ID document. It will be appreciated that an OTC card issuing process is by its nature can be an intermittent—in comparison to a continuous—process.

OTC identification documents of the types mentioned above can take a number of forms, depending on cost and desired features. Some OTC ID documents comprise highly plasticized poly(vinyl chloride) or have a composite structure with polyester laminated to 0.5-2.0 mil (13-51 .mu.m) poly (vinyl chloride) film, which provides a suitable receiving layer for heat transferable dyes which form a photographic image, together with any variant or invariant data required for the identification of the bearer. These data are subsequently protected to varying degrees by clear, thin (0.125-0.250 mil, 3-6 .mu.m) overlay patches applied at the printhead, holographic hot stamp foils (0.125-0.250 mil 3-6 .mu.m), or a clear polyester laminate (0.5-10 mil, 13-254 .mu.m) supporting common security features. These last two types of protective foil or laminate sometimes are applied at a laminating station separate from the printhead. The choice of laminate dictates the degree of durability and security imparted to the system in protecting the image and other data.

Concluding Remarks

Having described and illustrated the principles of the technology with reference to specific implementations, it will be recognized that the technology can be implemented in many other, different, forms, and in many different environments.

The technology disclosed herein can be used in combination with other technologies. Also, instead of ID documents, the inventive techniques can be employed with product tags, product packaging, labels, business cards, bags, charts, smart cards, maps, labels, etc., etc. The term ID document is broadly defined herein to include these tags, maps, labels, packaging, cards, etc.

It should be appreciated that while FIG. 1 illustrates a particular species of ID document—a driver's license—the present invention is not so limited. Indeed our inventive methods and techniques apply generally to all identification documents defined above. Moreover, our techniques are applicable to non-ID documents. Further, instead of ID documents, the inventive techniques can be employed with product tags, product packaging, business cards, bags, charts, maps, labels, etc., etc. The term ID document is broadly defined herein to include these tags, labels, packaging, cards, etc.

It should be understood that various printing processes could be used to create the identification documents described in this document. It will be appreciated by those of ordinary skill in the art that several print technologies including but not limited to indigo (variable offset) laser xerography (variable printing), offset printing (fixed printing), inkjet (variable printing), dye infusion, mass-transfer, wax transfer, variable dot transfer, laser engraving can be used to print variable and/or fixed information one or more layers of the document. The information can be printed using dots, lines or other structures of varying colors to form text or images. The information also can comprise process colors, spot or pantone colors.

It should be understood that, in the Figures of this application, in some instances, a plurality of method steps may be shown as illustrative of a particular method, and a single method step may be shown as illustrative of a plurality of a particular method steps. It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or steps. In addition, the total number of elements or steps shown for a particular system element or method is not intended to be limiting; those skilled in the art will recognize that the number of a particular system element or method steps can, in some instances, be selected to accommodate the particular user needs.

To provide a comprehensive disclosure without unduly lengthening the specification, applicants hereby incorporate by reference each of the U.S. patent documents referenced above.

The technology and solutions disclosed herein have made use of elements and techniques known from the cited documents. Other elements and techniques from the cited documents can similarly be combined to yield further implementations within the scope of the present invention.

Thus, the exemplary embodiments are only selected samples of the solutions available by combining the teachings referenced above. The other solutions necessarily are not exhaustively described herein, but are fairly within the understanding of an artisan given the foregoing disclosure and familiarity with the cited art. The particular combinations of elements and features in the above-detailed embodiments are exemplary only; the interchanging and substitution of these teachings with other teachings in this and the incorporated-by-reference patent documents are also expressly contemplated.

In describing the embodiments of the invention illustrated in the figures, specific terminology is used for the sake of clarity. However, the invention is not limited to the specific terms so selected, and each specific term at least includes all technical and functional equivalents that operate in a similar manner to accomplish a similar purpose.

What is claimed is:

1. A laminate for a document comprising:
   a polyester composite material formed from different polyester materials, one of the materials providing an outer surface comprising PCTA, and another of the materials providing an inner surface comprising PETG; wherein the PETG forms a bonding layer for bonding directly to a document core without adhesive, the core comprising polyester to enable formation of a polyester document structure without a discernable interface between the polyester laminate and the core.

2. The laminate of claim 1 wherein the PCTA forms a durable outer layer on the PETG.

3. The laminate of claim 1 wherein the PETG is operable to be bonded directly to a core using a roll to roll or platen press process.

4. The laminate of claim 3 wherein the core includes a polyolefin or polyester printable substrate.

5. A laminated document comprising:
   a laminate including a first polyester material comprising PCTA and a second polyester material comprising PETG;
   a core layer bonded directly to the laminate using a bonding property of the PETG; wherein the core layer comprises polyester, such that when the laminate is bonded directly to the core, there is no discernable interface between the laminate and the core.

6. The document of claim 5 wherein the core layer comprises a preprinted polyolefin substrate.

* * * * *